United States Patent
Munch et al.

[15] 3,695,600
[45] Oct. 3, 1972

[54] APPARATUS FOR FLAME SCARFING THE SURFACES OF CRUDE BLOCKS, BILLETS, INGOTS AND SIMILAR WORKPIECES

[72] Inventors: Gerhard Munch, Frankfurt am Main; Albert Jager, Rommelhausen, both of Germany

[73] Assignee: Messer Griesheim GmbH, Frankfurt am Main, Germany

[22] Filed: Sept. 4, 1970

[21] Appl. No.: 69,821

[30] Foreign Application Priority Data

Oct. 18, 1969 Germany..........P 19 47 284.5

[52] U.S. Cl. .............................266/23 H, 266/23 K
[51] Int. Cl. .............................................B23k 7/06
[58] Field of Search ...........................266/23 H, 23 K

[56] References Cited

UNITED STATES PATENTS

| | | |
|---|---|---|
| 2,290,271 | 7/1942 | Bucknam..................266/23 H |
| 2,186,096 | 1/1940 | Bucknam..................266/23 H |
| 2,480,308 | 8/1949 | Smith......................266/23 H |
| 3,035,947 | 5/1962 | Milton et al. ............266/23 H |
| 2,295,523 | 9/1942 | Buckman et al. ........266/23 H |
| 2,329,270 | 9/1943 | Jones......................266/23 H |
| 2,515,302 | 7/1950 | Hughey...................266/23 K |
| 3,176,971 | 4/1965 | Hulton et al............266/23 H |

Primary Examiner—Gerald A. Dost
Attorney—Ernest F. Marmorek

[57] ABSTRACT

An apparatus for flame scarfing the surfaces of crude blocks, billets, ingots and like workpieces, consisting of an operating carriage movable in guides and, a jib arm secured on the operating carriage and extending over the workpieces which are to be flame scarfed, carrying a vertically and horizontally adjustable scarfing torch assembly, having a torch head mounted for rotation about an axis coaxial with the direction of feed of the torch.

7 Claims, 2 Drawing Figures

PATENTED OCT 3 1972

INVENTORS:
Gerhard Münch
and Albert Jäger,
BY

Ernest A. Marmorek,
Their Attorney

APPARATUS FOR FLAME SCARFING THE SURFACES OF CRUDE BLOCKS, BILLETS, INGOTS AND SIMILAR WORKPIECES

FIELD OF THE INVENTION

The present invention relates to an apparatus for the flame scarfing of surfaces of crude blocks, billets, ingots and like workpieces consisting of an operating carriage movable in guides and a jib mounted on the operating carriage and extending over the workpieces which are to be flame scarfed, such jib carrying a vertically and laterally adjustable flame scarfing torch assembly.

BACKGROUND OF THE INVENTION

Superficial faults on the crude block or semi-finished product cannot always be avoided, in spite of strict supervision and careful working during melting and moulding, by reason of the many possible sources of faults. They often result in the failure of sensitive material and so reduce the yield. It is intended that cleaning of crude blocks and semi-finished products should prevent this failure in order to achieve a fault-free surface on the finished product.

Known mechanical processes for surface treatment are manual cleaning by means of a compressed air chisel and grinding machines as well as mechanical cleaning involving turning, planing and milling. Recently, there has been an increasing tendency to treat the surfaces of crude blocks, billets and ingots by flame scarfing. This method of surface treatment was developed in the USA (U.S. Pat. No. 1,957,351) and introduced into Germany under the name "torch deseaming" and "oxygen planing." Flame scarfing is carried out with similar appliances and the same gases as torch cutting. Heating-up initiates the flame scarfing process, the heating-up temperature being above the solidus of steel. When the steel has melted, the oxygen is switched on and the flow of melt is pushed in front of the forwardly moving torch. In order to achieve a definite depth of surface removal, there is a favorable setting of the scarfing appliance and scarfing speed for each material, depending on its composition and temperature.

Manual flame scarfing is mostly restricted to the removal of localized faults. Flame scarfing of larger workpiece surfaces using a hand torch is not simple because the quality of the flame scarfed surface depends on the manual dexterity of the operator and a regular surface can never be achieved. A further disadvantage of flame scarfing by means of a hand torch is that for one operator it is possible only with difficulty to flame scarf even relatively hot workpieces. When there is, however, a need to treat workpieces at a temperature of 500°–1,000° C. and with a hand torch, this is impossible.

For this reason, it has become practice to develop large flame scarfing machines, the design of which is governed by the following criteria:

a. Considerable flame scarfing capacity in a small space;
b. Saving on gas, particularly oxygen;
c. Best adjustment of the burners to achieve the particular dept desired;
d. Surface to be scarfed evenly all over;
e. Saving on labor;
f. Facilitation of arduous manual work with minimum risk of accident; and
g. Possibility of hot scarfing at workpiece temperatures of even more than 500° C. without the heat bothering the operators.

Such a known flame scarfing machine (Journal "Schweissen und Schneiden," 10th year/1958, No. 3) consists essentially of a drive carriage mobile on a guideway and carrying a jib extending over the workpieces which are to be treated, a torch carriage being mounted on this jib so as to be mobile transversely to the direction of travel of the carriage and carrying vertically adjustable alongside of one another a plurality of torch heads. Such a flame scarfing machine can be adjusted to a definite depth of treatment so that the surface of the workpiece is evenly treated.

Where such flame scarfing machines are concerned, it is furthermore known (Austrian Pat. No. 262,728) for the individual torch heads which are assembled into one unit to be made so that they can be switched off individually, and for the individual torch heads to be provided with separate cutting oxygen supplies so that if necessary individual parts of the workpiece surface may be treated with a more intense depth of scarfing. Where this machine is concerned, it has already been proposed likewise laterally to provide at least one additional flame scarfing head for treating the side faces of the workpiece.

Despite certain advantages of mechanical flame scarfing as compared with manual flame scarfing, the use of these relatively heavy machines is dependent on a few important conditions. For practical purposes, flame scarfing machines can be used economically only where there is a correspondingly high rate of output of workpieces which are to be machined. For smaller and medium-sized firms, such an investment would not be worthwhile. In addition, these heavy flame scarfing machines require comparatively considerable space and it is only at great expense that they can if necessary be dismantled and set up again elsewhere.

SUMMARY OF THE INVENTION

It is at this point that the present invention intercedes, having set out as its primary subject to provide an apparatus for flame scarfing the surfaces of crude blocks, billets, ingots and like workpieces, having on the one hand advantages of manual flame scarfing but avoiding their disadvantages and on the other resorting to the advantages of flame scarfing machines without having the characteristics of such a heavy machine. The simple construction and small space required by the object of the present invention should make it economical particularly for use in smaller and medium-sized companies.

According to the invention, in the case of an apparatus for flame scarfing the surfaces of crude blocks, billets, ingots and like workpieces, and consisting of a working carriage mobile in guides and having mounted on this carriage a jib extending over the workpieces which are to be treated and the jib carrying a vertically and laterally adjustable flame scarfing assembly, it is suggested for this purpose that the torch assembly have a torch head mounted for rotation about an axis coaxial with the direction of feed of the torch.

It is further envisaged that the rotatable torch head have a maximum scarfing width of 300 mm.

This construction according to the invention thus constitutes an intermediate stage between a manual scarfing torch and a machine scarfing torch. With the torch head, it is possible on the one hand to achieve even scarfing of the surface of the workpiece; individual faults within the surface may be improved and it is possible by a simple pivoting of the torch head, to use it also for scarfing the lateral faces of the workpiece to be treated. Both cold and hot workpieces may be treated. Restricting the width of scarfing also provides for substantially lighter construction, the space required is reduced, the manufacturing costs substantially reduced and the apparatus is therefore economically interesting even for any small production.

The particular mounting of the torch head according to the invention is characterized in that the rotatable torch head is mounted on a bearing arm which in turn is in per se known manner vertically adjustably mounted on the torch carriage which runs in guides in the jib. It is further proposed that the rotatable torch head be mounted by means of a bolt-like projection inside a bearing bush of the bearing arm, a bowden cable engaging on the bolt-like projection for its rotation. The point of attachment of the bowden cable is thereby preferably constructed in the manner of a cable pulley so that the torch head may be rotated up to 360°.

It is also possible for an additional bowden cable to engage on the bearing arm for purposes of vertical adjustment. Both bowden cables are thereby preferably extended to the operating carriage over guide members, whence they are operated in known manner by the operator.

BRIEF DESCRIPTION OF THE DRAWINGS

The invention will become more readily apparent from the following description of a preferred embodiment thereof shown, by way of example, in the attached drawings, in which.

DESCRIPTION OF THE PREFERRED EMBODIMENT

Figure 1:
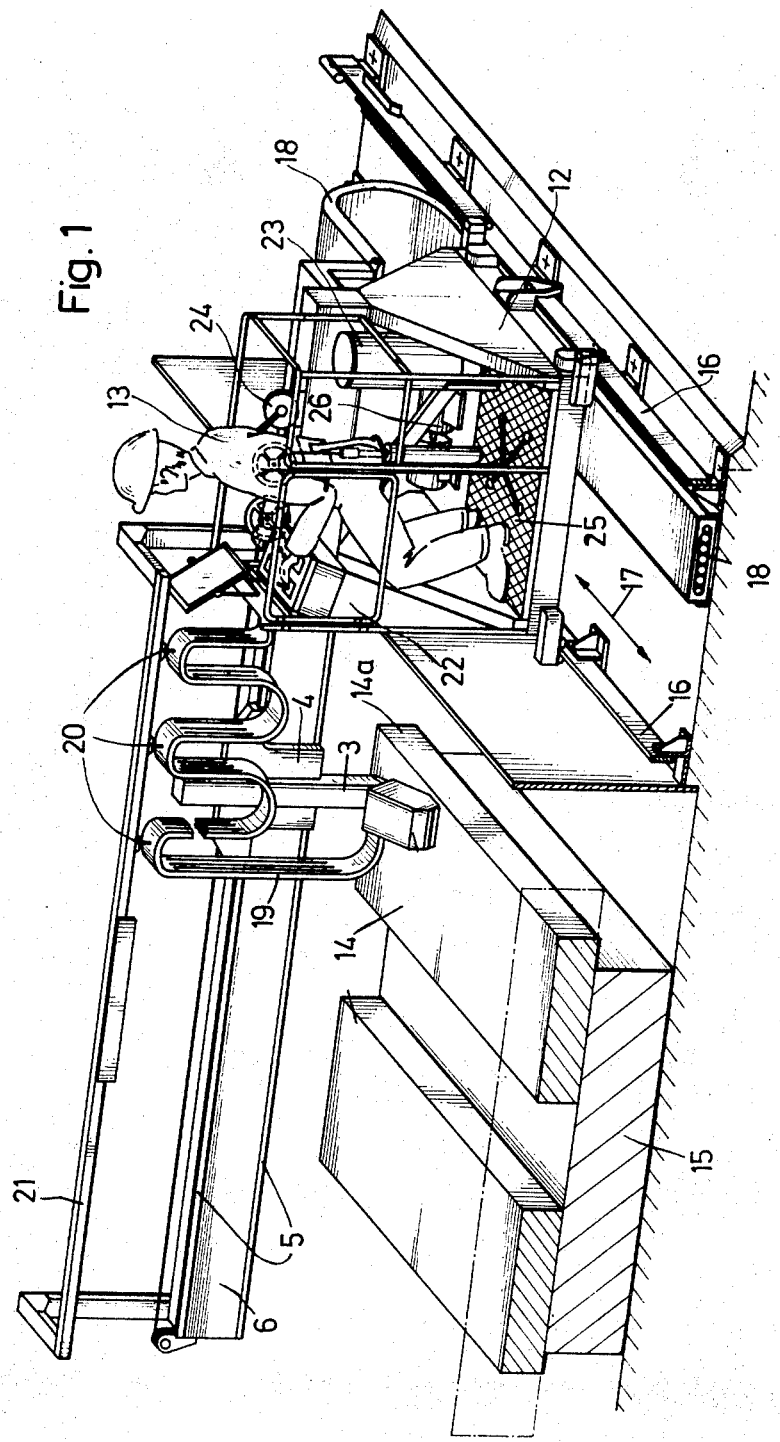
FIG. 1 is a perspective view of the apparatus.

As Fig. 1 shows, the apparatus according to the invention consists of the operating carriage 12 which is mobile in the direction of the arrow 17 on rails 16 and the actual jib arm 6 on which the torch carriage 4 is mounted for displacement in guides 5. Vertically adjustable on the torch carriage 4 is a bearing arm 3 on which the actual torch head 1 is secured. Reference numeral 14 denotes two workpieces which rest on a support 15. Between the rails 16 is a cable towing chain 18 accommodating the gas supply hoses as well as the hoses for water, air and electrical cables. The positioning of the hose supply between the rails 16 provides not only for good space utilization but also an additional safeguard under conditions of foundry operation. In the region of the torch head 1, the hoses 19 are suspended on the carriage 20 guided in a guide rail 21. On the platform 25 which carries the seat for the operator 13, there are also the powder tank 23 and the driving motor 26. The powder required for the flame scarfing process is taken from the powder tank 23 and fed to the torch head 1 through a pipe which is not shown in detail for the sake of simplicity. Reference numeral 22 denotes a switchbox at which the operator 13 can control all the processes.

In the example illustrated, there is only a single torch head 1 provided, with which for example a workpiece 14 may be surface treated by a triple reciprocal passage. After the torch head 1 has been rotated through 90°, it can then flame scarf the sides 14a of the workpiece 14. After the workpiece 14 has been turned, then the back and the other side faces may be flame scarfed accordingly in a further operation. Thus, only one turning of the workpiece is required for the entire workpiece to be treated.

Figure 2:
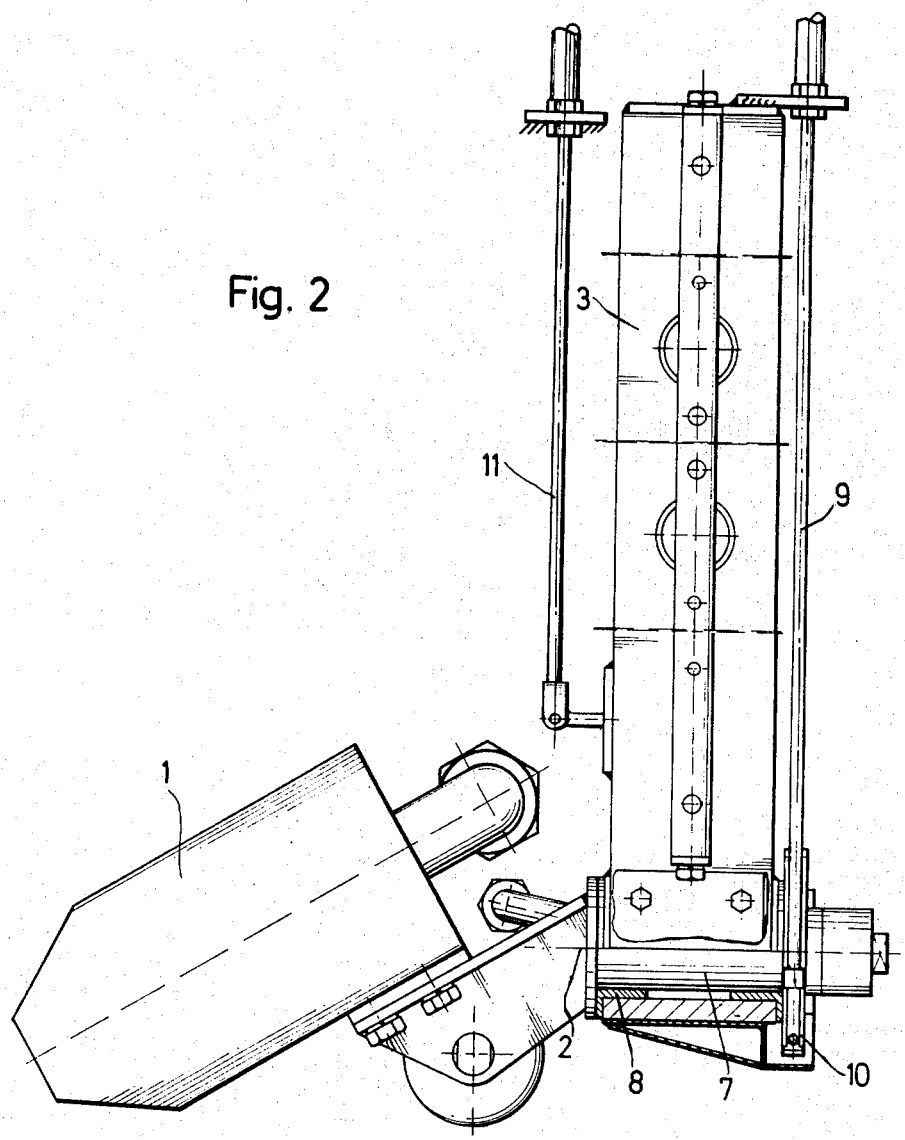
FIG. 2 is a cross-section through the mounting of the torch head.

The rotatable mounting of the torch head 1 is shown in Fig. 2. The torch head 1 has a bolt-shaped projection 7 seated inside a bush 8 in the bearing arm 3. Secured on the bolt-shaped projection 7 is a rope pulley 10 on which a bowden control cable 9 engages. Through this bowden cable 9 which is actuated by the operator 13, it is possible for the torch head 1 to be pivoted about the axis 2. Reference numeral 11 denotes a further bowden cable attached to the bearing arm 3 and used for vertical adjustment of this latter.

From the above, it is apparent that although the invention has been described hereinbefore with respect to a specific embodiment thereof, it is evident that many modifications and changes may be made without departing from the spirit of the invention. Accordingly, by the appended claims, we intend to cover all such modifications and changes as fall within the true spirit and scope of this invention.

We claim:

1. An apparatus for flame scarfing the surfaces of crude blocks, billets, ingots and like workpieces, comprising an operating carriage mobile in guides in the direction of scarfing, a jib arm secured on the operating carriage and extending over the workpieces which are to be flame scarfed, said jib arm carrying a vertically and horizontally adjustable scarfing torch assembly, said torch assembly comprising a torch head having a single scarfing plane and being mounted for rotation about an axis arranged in said scarfing direction and intersecting said torch head.

2. An apparatus as claimed in claim 1, wherein said rotatably mounted torch head has a maximum scarfing width of 300 mm.

3. An apparatus as claimed in claim 1, wherein said rotatably mounted torch head is secured on a bearing arm vertically adjustably mounted on said torch carriage which runs in guides in the jib arm.

4. An apparatus as claimed in claim 1, comprising a bearing arm having a bushing therein, bolt means mounting said rotatable torch head in said bushing, said bolt means being a bolt-shaped projection, a bowden cable engaging said bolt-shaped projection at a point for rotation thereof.

5. An apparatus as claimed in claim 4, wherein the point of attachment of said bowden cable is constructed in the manner of a rope pulley.

6. An apparatus as claimed in claim 4, wherein an additional bowden cable engages on the bearing arm for vertical adjustment thereof.

7. An apparatus as claimed in claim 6, wherein in both said bowden cables are guided to said operating carriage over guide members for actuation from there by the operator.

* * * * *